UNITED STATES PATENT OFFICE.

JOHN NAISH GOLDSMITH, OF HOLBORN, LONDON, ENGLAND, ASSIGNOR TO THE BRITISH EMAILLITE COMPANY, LIMITED, OF PICCADILLY CIRCUS, LONDON, ENGLAND.

CELLULOSE-ESTER DOPE OR VARNISH.

1,298,199.     Specification of Letters Patent.     Patented Mar. 25, 1919.

No Drawing.     Application filed June 13, 1917. Serial No. 174,545.

*To all whom it may concern:*

Be it known that I, JOHN NAISH GOLDSMITH, a subject of the King of Great Britain, residing at 67 Chancery Lane, Holborn, in the county of London, England, have invented certain new and useful Improvements in Cellulose-Ester Dope or Varnish, of which the following is a specification.

This invention relates to the manufacture of dopes of the kind used for coating the surfaces of aeroplanes, and its chief objects are to improve the adhesiveness, strength and surface of the coating and to reduce or eliminate the poisonous or deleterious properties of dopes. Dopes as at present employed consist broadly of solutions of cellulose esters, especially the acetate, in such solvents as acetone, tetrachlorethane, ketone, methylated spirit and benzene, usually with a small proportion of triphenyl phosphate, added with the object of reducing the inflammability. Aeroplane dopes must produce in and on the fabric employed an elastic highly contractile film with a hard surface which when struck must yield a clear resonant note (an indication that the necessary contraction has been obtained) with sufficient body and rigidity (obtained by a succession of coats) to retain its stream line contour during flight.

According to this invention I add to a cellulose ester dope prepared so as to produce a film having the above characteristics a proportion of acetanilid or a mixture of acetanilid and triacetin, amounting preferably, for ordinary aeroplane purposes, to form about 5 to about 40 per cent. by weight (or for special purposes up to about 100 per cent.) of the cellulose ester. The ratio of triacetin to acetanilid in the mixture of these two substances may vary from about 1:5 to 3:2 for general purposes. When the triacetin much exceeds the acetanilid the dope films are less resistant to weathering. The resistance of these dope films to the weather is also influenced by the substances already mentioned as generally employed in dopes.

The above stated ingredients (acetanilid or a mixture of acetanilid and triacetin) are found to give in the dope properties hitherto obtained only by the use of tetrachlorethane, or an equivalent chlorinated hydrocarbon which is generally used in large quantities, amounting to from 10 to 50 per cent. or more by weight of the entire dope, that is from about 100 to 500 per cent. of the cellulose acetate. Tetrachlorethane is volatile and is known to produce poisonous effects so that efforts have been made to reduce the amount used to a minimum. By the employment of triacetin and acetanilid or acetanilid singly the tetrachlorethane may be completely eliminated and the dope thus rendered harmless to the persons engaged in manufacturing or applying it. A bloom or efflorescence which is harmless in nature is found to be developed by the use of the acetanilid addition only, but this is not found with the acetanilid-triacetin mixture.

With regard to the proportions of triacetin and acetanilid to the cellulose ester the desired characteristics of the dope have to be considered. Where a rapid tightening effect on the doped fabric is the chief object, 5 to 10 per cent. of acetanilid alone or of the mixture is sufficient, but for general purposes the most desirable percentages (taking the cellulose ester as the standard of measurement) are higher, for example, about 13 per cent. of acetanilid with 17 per cent. of triacetin, making 30 per cent. of the mixture, or 25 per cent. of acetanilid alone.

Where a less rigid effect is desired, for instance for a later or final coating, a higher percentage of the ingredient or ingredients may be used, say, about 40 per cent. for a moderate increase of pliability, while experience has shown that a durable and pliable film is obtained with even up to 100 per cent., for special purposes, such as the finishing coats of aeroplanes, 25 per cent. of acetanilid with 17 per cent. of triacetin may be given as an example of a useful moderately high percentage mixture.

In cases where the presence of tetrachlorethane or other chlorinated hydrocarbon is not objectionable, for example, where ample ventilation is obtainable, the addition of the further ingredients according to my invention may be made to dopes containing the said chlorinated compound or compounds, the addition giving improved adhesiveness, strength and glossy surface to the doped fabric and freedom from white patches. As an example of an addition to an ordinary dope we may add two parts of acetanilid or the mixture of acetanilid and triacetin to a dope containing twenty parts of dissolved cellulose acetate.

The following are typical examples of the ingredients in suitable proportions of non-poisonous dopes prepared according to our invention. It is to be understood that the proportions of acetanilid or the mixture thereof with triacetin bear no definite relation to the proportions of tetrachlorethane as hitherto used, but are related only to the weight of cellulose ester present in the dope. The proportions of the solvents employed may therefore vary considerably but the examples given below contain proportions suitable for ordinary purposes:—

1.

| | | |
|---|---|---|
| Cellulose acetate | 21 | grams. |
| Triphenyl phosphate | 1.8 | grams. |
| Acetone | 255 | c. c. |
| Triacetin | 3 | c. c. |
| Acetanilid | 2.7 | grams. |

2.

| | | |
|---|---|---|
| Cellulose acetate | 21 | grams. |
| Triphenyl phosphate | 3 | grams. |
| "Methyl acetone" | 100 | c. c. |
| Methyl ethyl ketone | 150 | c. c. |
| Acetanilid | 5 | grams. |

("Methyl acetone" is a commercial mixture of acetone, methyl alcohol and methyl acetate).

3.

| | | |
|---|---|---|
| Cellulose acetate | 22 | grams. |
| "Methyl acetone" | 150 | c. c. |
| Methyl ethyl ketone | 25 | c. c. |
| Benzol | 75 | c. c. |
| Triacetin | 3 | c. c. |
| Acetanilid | 2.5 | grams. |

4.

(As an example of a less rigid dope).

| | | |
|---|---|---|
| Cellulose acetate | 21 | grams. |
| Triphenyl phosphate | 2.7 | grams. |
| "Methyl acetone" | 100 | c. c. |
| Methyl ethyl ketone | 150 | c. c. |
| Triacetin | 8 | c. c. |
| Acetanilid | 10 | grams. |

When acetanilid with or without triacetin is used according to this invention it may be employed in conjunction with other camphor substitutes and with solvents other than those specifically mentioned, which are given merely as examples.

What I claim and desire to secure by Letters Patent of the United States is:—

1. A cellulose ester dope of the kind set forth, containing a small proportion of acetanilid and triacetin for the purpose specified.

2. A cellulose ester dope of the kind set forth containing acetanilid or a mixture of acetanilid and triacetin amounting to from 5 to about 100 per cent. of the cellulose ester.

JOHN NAISH GOLDSMITH.